April 11, 1939.  J. L. MOHAR  2,153,896

CURB INDICATOR AND BUMPER FOR VEHICLES

Filed June 29, 1936

INVENTOR.
JACK L. MOHAR.
BY
ATTORNEY

Patented Apr. 11, 1939

2,153,896

UNITED STATES PATENT OFFICE 2,153,896

CURB INDICATOR AND BUMPER FOR VEHICLES

Jack L. Mohar, Los Angeles, Calif.

Application June 29, 1936, Serial No. 87,946

1 Claim. (Cl. 200—52)

My present invention relates to a curb indicator and bumper for automobiles or other vehicles of low body design.

The principal object of my invention is to provide a means for the protection against damage of protruding parts of vehicles, such as fenders, or the like, particularly when parking the vehicle, such as, alongside a curb, by inherently protecting or guarding such protruding part and further by audibly or otherwise warning the driver of such impending damage or the presence of interfering objects.

Another object of this invention is to provide such means which may be readily attached or detached to such protruding part of the vehicle.

An important object also is the provision of such means which is ornamental in appearance and adds, rather than detracts, to the appearance of the vehicle.

A further object is the provision of means of this class which serves as a clearance switch for warning and informing the driver, when near the curb, or other object, of the approximate clearance between the vehicle and the curb or the other object.

With these and other objects in view, as will appear hereinafter, I have devised an article having certain novel features of construction, as will be hereinafter described in detail and particularly set forth in the appended claim, reference being had to the accompanying drawing and to the characters of reference thereon which form a part of this application, in which:

Figure 1:
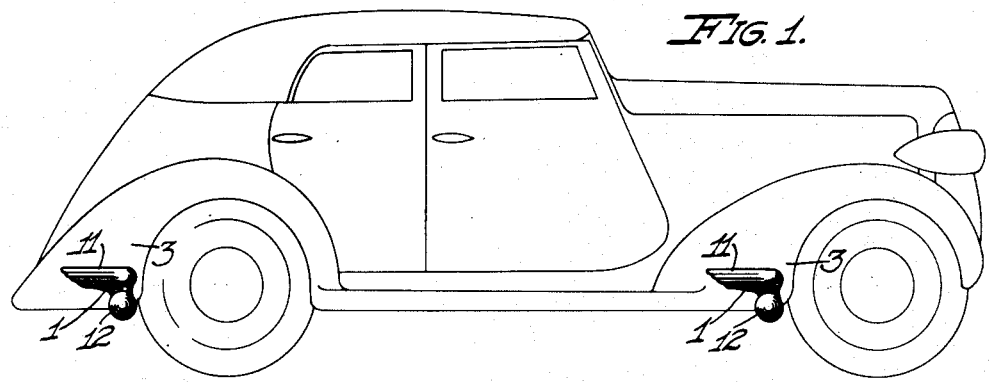
Fig. 1 is a diagrammatic side view of an automobile showing my device attached to each of the two fenders.
Figure 2:
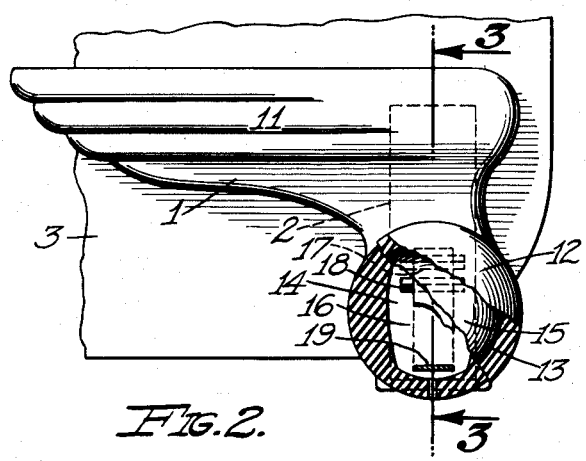
Fig. 2 is an enlarged side view of the device shown attached to a fragmentary portion of a fender, and showing a portion of the device broken away to facilitate the illustration.
Figure 3:
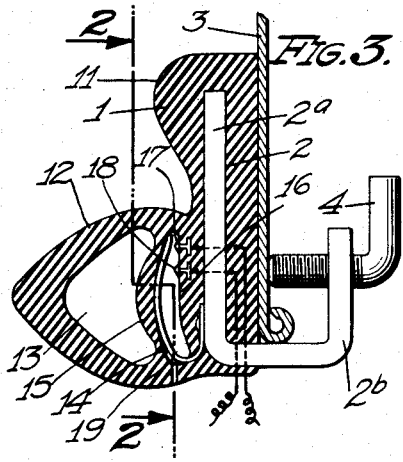
Fig. 3 is a sectional elevation thereof taken through 3—3 of Fig. 1.
Figure 4:
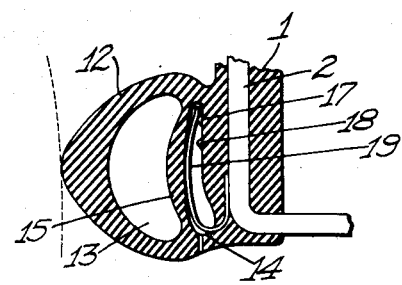
Fig. 4 is a fragmentary section, similar to Fig. 3, with the extension or protrusion slightly depressed.
Figure 5:
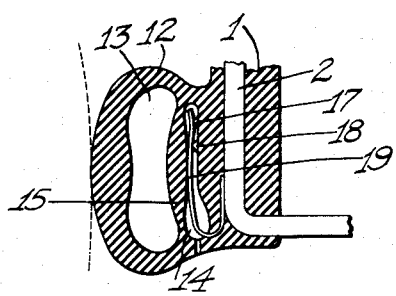
Fig. 5 is a similar view with the protrusion depressed to a larger extent.

My new device, as illustrated in the drawing, consists essentially of a bumper member 1 and a clamp member 2, the latter being substantially a U-clamp member. The bumper 1 is preferably made of rubber and is cast around one leg 2ª of the clamp member. The bumper may be placed at the outer side of a fender 3, or other element of the vehicle, and arranged longitudinally of the vehicle. The clamp member straddles the edge of the fender and is secured to the fender by a screw extending through the other leg of the clamp member. The rubber bumper provides a yieldable seat for securing the device to the fender.

The bumper member may also consist of two essential parts, namely the bumper proper 11 and the lateral protrusion 12. The former, when viewed from the side of the automobile, is preferably in the form of wing, and is made relatively thick. This presents an ornamental or decorative appearance. The protrusion 12 is positioned lower and near the normally forward end of the device. This protrusion in this instance is bell shaped and is hollow, forming an air tight or sealed chamber 13. Behind the chamber 13, that is, between this chamber and the main portion of the bumper member is another chamber 14 which is preferably not sealed. The chambers are separated by a thin yieldable wall 15. On the bottom wall 16 of the protrusion are two contacts 17 and 18, each of which is electrically connected to different signalling means, such as, buzzers or lights (not shown.) On the leg 2ª of the clamp member is secured a flexible contact 19 which is adapted to be engaged by the wall 15 and distorted or pressed downwardly to engage either the contact 17 or both contacts 17 and 18, depending upon the extent to which the wall 15 is pressed inwardly. Such distortion of the wall 15 is effected when the protrusion 12 engages a curb or other object, which causes the air in the chamber 13 to be compressed and the wall 15 to be forced inwardly.

In this manner my device serves as a clearance switch, warning the driver of varying distortion of the protrusion, and, therefore, different distances or clearances between the vehicle and the curb or other object.

Though I have shown and described a particular construction, combination, and arrangement of parts and portions, I do not wish to be limited to the same, but desire to include in the scope of my invention the construction, combination, and arrangement substantially as set forth in the appended claim.

I claim:

In a device of the class described, the combination with an automobile fender, of a rubber bumper securable to the fender, the bumper having a protrusion extending outwardly beyond the main portion of the bumper and having therein a sealed main chamber and a second chamber between said protrusion and said main portion, said chambers being separated by a wall, and a switch in the second chamber adapted to be actuated by distortion of the wall between the two chambers.

JACK L. MOHAR.